(12) United States Patent
Angquist et al.

(10) Patent No.: US 11,856,315 B2
(45) Date of Patent: Dec. 26, 2023

(54) MEDIA EDITING APPLICATION WITH ANCHORED TIMELINE FOR CAPTIONS AND SUBTITLES

(71) Applicant: Apple Inc., Cupertino, CA (US)

(72) Inventors: Nils Angquist, Los Altos Hills, CA (US); Zachary Kramer, San Francisco, CA (US); James J. Hodges, Santa Clara, CA (US); Wesley Plate, Redwood City, CA (US); Dylan Grant Keith, Ottawa (CA); Peter Matthew Battaglia, Cupertino, CA (US); Colleen M. Pendergast, Livermore, CA (US); Nathan Bingham, Santa Clara, CA (US); Hope Renee Boyarsky, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/936,300

(22) Filed: Mar. 26, 2018

(65) Prior Publication Data

US 2019/0104259 A1    Apr. 4, 2019

Related U.S. Application Data

(60) Provisional application No. 62/565,526, filed on Sep. 29, 2017.

(51) Int. Cl.
| | |
|---|---|
| *H04N 5/278* | (2006.01) |
| *G11B 27/036* | (2006.01) |
| *G06F 3/0482* | (2013.01) |
| *G06F 3/04845* | (2022.01) |
| *G11B 27/34* | (2006.01) |

(52) U.S. Cl.
CPC ........... *H04N 5/278* (2013.01); *G06F 3/0482* (2013.01); *G06F 3/04845* (2013.01); *G11B 27/036* (2013.01); *G11B 27/34* (2013.01)

(58) Field of Classification Search
CPC .............. G06F 16/7867; G06F 3/0482; G06F 3/04845; H04N 21/4856; H04N 21/4884; H04N 5/278; G11B 27/036; G11B 27/034; G11B 27/34
USPC ....................................................... 715/720
See application file for complete search history.

(56) References Cited

U.S. PATENT DOCUMENTS

| | | | |
|---|---|---|---|
| 9,323,438 B2* | 4/2016 | Khan | G06F 3/04842 |
| 2012/0210220 A1 | 8/2012 | Pendergast et al. | |
| 2013/0073964 A1* | 3/2013 | Meaney | G11B 27/031 |
| | | | 715/716 |

(Continued)

*Primary Examiner* — Stephen S Hong
*Assistant Examiner* — Nicholas Hasty
(74) *Attorney, Agent, or Firm* — Fish & Richardson P.C.

(57) ABSTRACT

Systems, methods, apparatuses and non-transitory, computer-readable storage mediums are disclosed for a media editing application with an anchored timeline for editing captions and subtitles. In an embodiment, a method comprises: causing to display on a display device, by one or more hardware processors executing a media editing application, a graphical user interface (GUI) including a timeline; causing to display on the timeline, by the one or more hardware processors, a first lane including a media object; causing to display on the timeline, by the one or more hardware processors, a second lane including a caption or subtitle object; and anchoring, by the one or more hardware processors, the media object to the caption or subtitle object in the timeline.

25 Claims, 15 Drawing Sheets

(56) References Cited

U.S. PATENT DOCUMENTS

| | | | |
|---|---|---|---|
| 2013/0104042 A1* | 4/2013 | Meaney | G11B 27/034 |
| | | | 715/716 |
| 2014/0201631 A1* | 7/2014 | Pornprasitsakul | G11B 27/031 |
| | | | 715/716 |
| 2017/0188084 A1 | 6/2017 | Barreira Avegliano et al. | |

* cited by examiner

FIG. 7A

| Clips Captions Tags Roles | | |
|---|---|---|
| Caption String | Start Time | End Time |
| カメラコント | 00:05:24:00 | 00:05:26:00 |
| ええ準備にクール | 00:05:26:00 | 00:05:28:00 |
| これらの花を手 | 00:05:28:00 | 00:05:30:00 |
| チェックしてください | 00:05:30:00 | 00:05:32:00 |
| 私のカメラー | 00:05:32:00 | 00:05:34:00 |
| ここ | 00:05:34:00 | 00:05:36:00 |
| 和ない | 00:05:36:00 | 00:05:38:00 |
| 誰の雑誌ないで？ | 00:05:40:00 | 00:05:42:00 |

View Errors

FIG. 7B

| Clips Captions Tags Roles | | |
|---|---|---|
| Caption String | Start Time | End Time |
| これらの花を手 | 00:05:28:00 | 00:05:28:00 |
| 私のカメラー | 00:05:32:00 | 00:05:34:00 |
| これらの花を手 | 00:05:28:00 | 00:05:30:00 |

View All

MEDIA EDITING APPLICATION WITH ANCHORED TIMELINE FOR CAPTIONS AND SUBTITLES

CROSS-RELATED APPLICATION

This application claims the benefit of priority from U.S. Provisional Patent Application No. 62/565,526, for "Media Editing Application with Anchored Timeline for Captions and Subtitles," filed Sep. 29, 2017, which provisional patent application is incorporated by reference herein in its entirety.

TECHNICAL FIELD

This disclosure relates generally to media editing applications that allow editing of closed captions and subtitles.

BACKGROUND

A media editing application is a software program that runs on a computer and allows a user to create a multimedia project from a collection of media objects using non-destructive editing techniques. Some media editing applications provide the user with a graphical user interface (GUI) that includes a timeline where a user can arrange media objects representing media content, such as video and audio content, in a time ordered sequence. The user can edit each individual media object, including increasing or decreasing length (duration) of the object in the timeline. The user can also add objects representing background music, dialogue, transitions, special effects and titles to the timeline.

Closed captioning (CC) is a process of displaying text with video on a display device, where the text transcribes audio associated with the video. The text sometimes includes descriptions of non-speech elements like sound effects. Subtitling is a process of displaying text with video on a display device, where the text translates the associated audio from a primary or default language to a secondary language. Adding captions and subtitles during media editing can be a tedious process for a user because the captions and subtitles are often included on a separate lane from the video and audio objects. Each time the user edits a video or audio object (e.g., moves or changes the length of a video or audio object), the user also has to edit the corresponding caption or subtitle object, disrupting the editing workflow.

SUMMARY

Systems, methods, apparatuses and non-transitory, computer-readable storage mediums are disclosed for a media editing application with an anchored timeline for editing captions and subtitles.

In an embodiment, a method comprises: causing to display on a display device, by one or more hardware processors executing a media editing application, a graphical user interface (GUI) including a timeline; causing to display on the timeline, by the one or more hardware processors, a first lane including a media object; causing to display on the timeline, by the one or more hardware processors, a second lane including a caption or subtitle object; and anchoring, by the one or more hardware processors, the media object to the caption or subtitle object in the timeline.

In an embodiment, a media editing system comprises: an input interface; an output interface; one or more hardware processors; memory storing instructions that when executed by the one or more processors, cause the one or more processors to perform operations comprising: causing to display, by a display device coupled to the output interface, a graphical user interface (GUI) including a timeline; causing to display on the timeline a first lane including a media object; causing to display on the timeline a second lane including a caption or subtitle object; and anchoring the media object to the caption or subtitle object in the timeline.

Particular implementations disclosed herein provide one or more of the following advantages. A caption or subtitle object in a first lane of a timeline are anchored to a corresponding media object (e.g., video and audio clips) in a second lane of the timeline. This allows the user to edit a media object, such as moving the media object to a different position in the timeline. There can be any number of caption and subtitle objects anchored to the media object, such as different subtitle objects for different languages. Different lanes can be established for different languages with one language per lane. The lanes containing caption or subtitle objects can be hidden or exposed in the timeline in response to user input.

The caption and subtitle objects can be edited in their respective lanes using a caption/subtitle editing interface or an information inspector view. Caption and subtitle objects can be assigned to roles and subroles, which is metadata that can be used to manage the captions and subtitle objects in the timeline. The caption and subtitle text can be verified against a set of formatting rules for a particular caption or subtitle format, such as CEA-608 for closed captions and iTunes® Timed Text (ITT) for subtitles. A verification error window allows the user to search for and correct verification errors, such as overlapping caption or subtitle objects, caption text exceeding an allowable number of characters and caption text using invalid characters (e.g., Emojis).

Media objects can be displayed and selected in an event browser. Compound objects that include multiple caption or subtitle objects can be augmented with a glyph or other visual indicator that indicates that the compound clip includes multiple caption or subtitle objects. The caption and subtitle objects can be imported and exported from the media editing application as separate files or as part of a multimedia container file (e.g., iTunes® Media Package (ITMP)) that also includes media objects (e.g., audio and video clips). Caption and subtitle objects can be extracted from imported multimedia container files and automatically placed in the timeline. In an embodiment, a post-production transcoding application for finished projects includes a GUI that allows a user to review and edit a completed media project, including editing caption and subtitle objects in the media project. One or more search options are included in the GUI that allow a user to quickly search for specific captions or subtitle objects in the media project based on, for example, text terms or timecodes.

The details of the disclosed implementations are set forth in the accompanying drawings and the description below. Other features, objects and advantages are apparent from the description, drawings and claims.

DESCRIPTION OF DRAWINGS

FIGS. 7A and 7B illustrate views for displaying verification results for caption and subtitle objects, according to an embodiment.

The same reference symbol used in various drawings indicates like elements.

DETAILED DESCRIPTION

Example of Captions/Subtitles in Anchored Timeline

Figure 1:
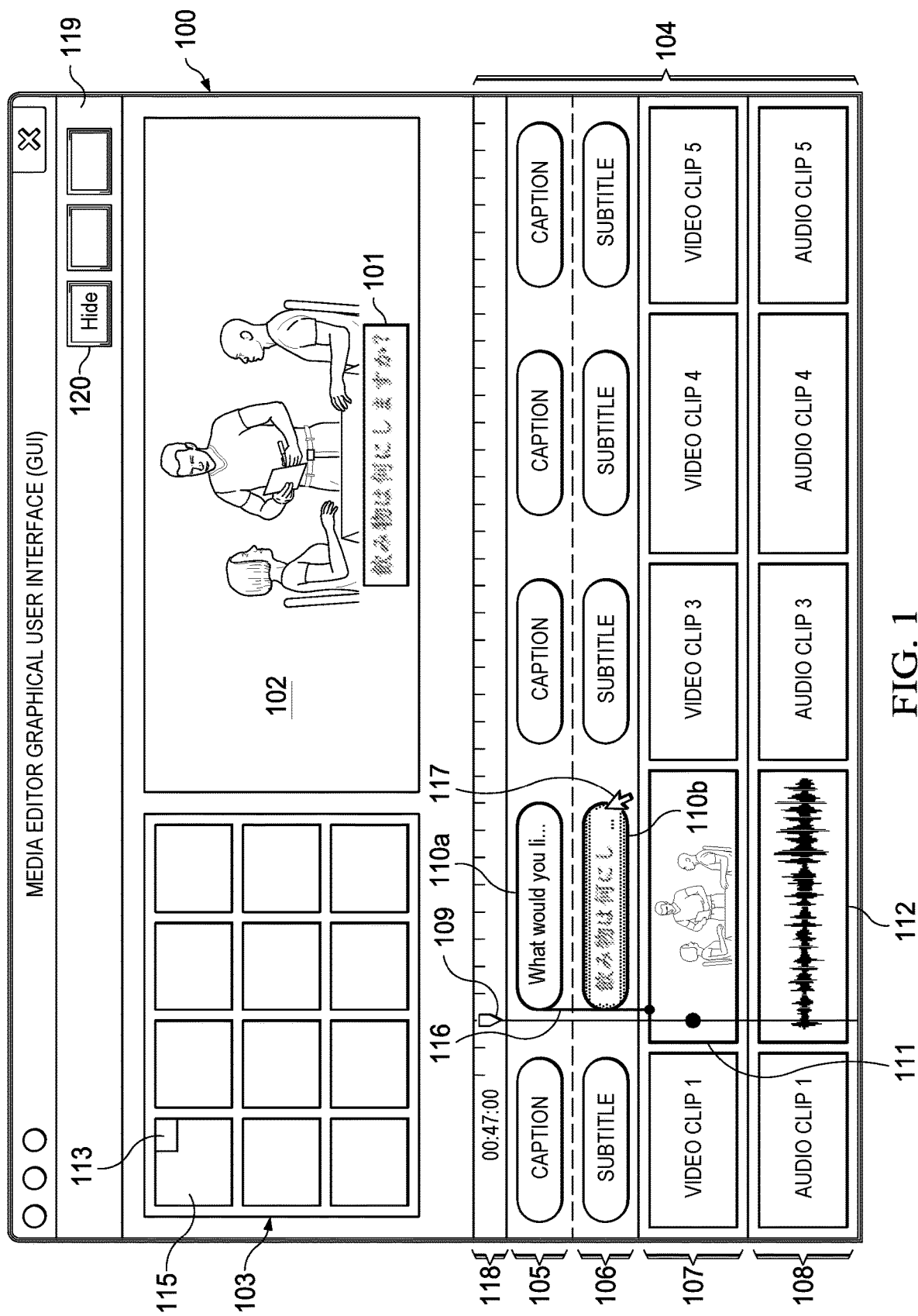
FIG. 1 illustrates a GUI for a media editing application including a timeline, according to an embodiment.

FIG. 1 illustrates a GUI 100 for a media editing application, according to an embodiment. GUI 100 includes viewer 102, event browser 103, timeline 104 and tool bar 119. Timeline 104 is a workspace that allows the user to arrange sequences of media objects and caption/subtitle objects in vertically stacked "lanes." Timeline 104 can be any GUI that can be used to arrange media objects in a time ordered sequence, including media editing applications that use traditional track-based GUIs. Timeline 104 includes time ruler 118, which assists the user with arranging media objects in the timeline of the media project.

In the example shown, timeline 104 includes caption lane 105, subtitle lane 106, video lane 107 and audio lane 108. Caption and subtitle lanes 105, 106 include caption and subtitle objects 110a, 110b, respectively. Video lane 107 includes video clips, such as video clip 111. Audio lane 108 includes audio clips, such as audio clip 112. Collectively, video and audio clips are also referred to herein as "media objects" to distinguish these objects from caption or subtitle objects. Other objects can be included in timeline 104 but have been omitted for clarity, including but not limited to, objects for titles, dialogue, music, transitions and sound effects (SFX). In an embodiment, each of these additional objects would have its own lane in timeline 104.

In FIG. 1, a user is working on a media project and has placed caption and subtitle objects 110a, 110b, in timeline 104 in a desired sequence. Objects 110a, 110b can be obtained from, for example, event browser 103. For example, the user can "drag 'n drop" compound object 115 (e.g., an object containing caption 110a, subtitle 110b, video clip 115 and audio clip 112) from event browser 103 to any desired position on timeline 104. A glyph or other visual indicator 113 can be displayed on or proximate to object 115 to indicate that object 115 is a compound object that contains a plurality of captions or subtitles.

In the example shown, the user has added closed caption (CC) object 110a to caption lane 105 and subtitle object 110b to subtitle lane 106. Object 110a contains English caption text and subtitle object 110b contains Japanese subtitle text. Any number of captions and subtitle objects can be added to timeline 104 and anchored to a corresponding media object. Each caption and subtitle object will have its own dedicated lane.

In an embodiment, the user can select input 120 (e.g., a virtual button) located in toolbar 119 to hide lanes 105, 106 to unclutter timeline 104. Alternatively, the user can select a menu option, shortcut keys or a gesture to hide/expose lanes 105, 106. For example, a media project can have subtitle objects for 14 different languages resulting in 14 separate subtitle lanes in timeline 104, one lane for each language. Such a large number of subtitle lanes would likely make editing difficult for the user.

In response to the user selecting video clip 111 with cursor 117, viewer 102 displays a frame of video clip 111, together with the selected subtitle object 110b. In response to the user input, the entire video clip represented by video clip 111 can be played in viewer 102 together with audio represented by audio clip 112 and a subtitle represented by subtitle object 110b. Playhead 109 marks the project's current position in timeline 104.

In the embodiment shown, caption and subtitle objects 110a, 110b are anchored to video clip 111 and audio clip 112. Anchor indicator 116 is also displayed in timeline 104 that shows a connection or association between caption and subtitle objects 110a, 110b and video and audio clips 111, 112. Anchor indicator 116 can be any graphic that indicates an anchor or connection between caption/subtitle objects and media objects. In the example shown, the anchor indicator 116 is a line (e.g., a yellow line) connecting objects 110a, 110b and media objects 111, 112. Each clip in the anchored group of clips is highlighted (e.g., with a yellow border) to indicate their selection in timeline 104. Anchored objects 110a, 110b, 111, 112 can be concurrently manipulated by the user as a single group of objects in timeline 104, as described in further detail in reference to FIGS. 2A and 2B.

In an embodiment, captions or subtitle objects can be anchored to media objects in timeline 104 either manually through user input or automatically by the media editing application. For manual anchoring, the user selects using cursor 117 the video clip 111 or audio clip 112 that the user wishes to connect a caption or subtitle to and then invokes an "Add Caption" command (e.g., menu command, shortcut keys, gesture) to create the connection. A new caption/subtitle is created and anchored to the selected clip.

In an embodiment, a caption or subtitle object can be manually re-anchored to a different media object by the user selecting the caption or subtitle they wish to re-anchor. The user holds a shortcut key (e.g., Command-Option) then clicks the media object they wish to re-anchor the caption or subtitle to. The caption or subtitle is now anchored to the Command-Option-clicked media object.

Figure 2A:
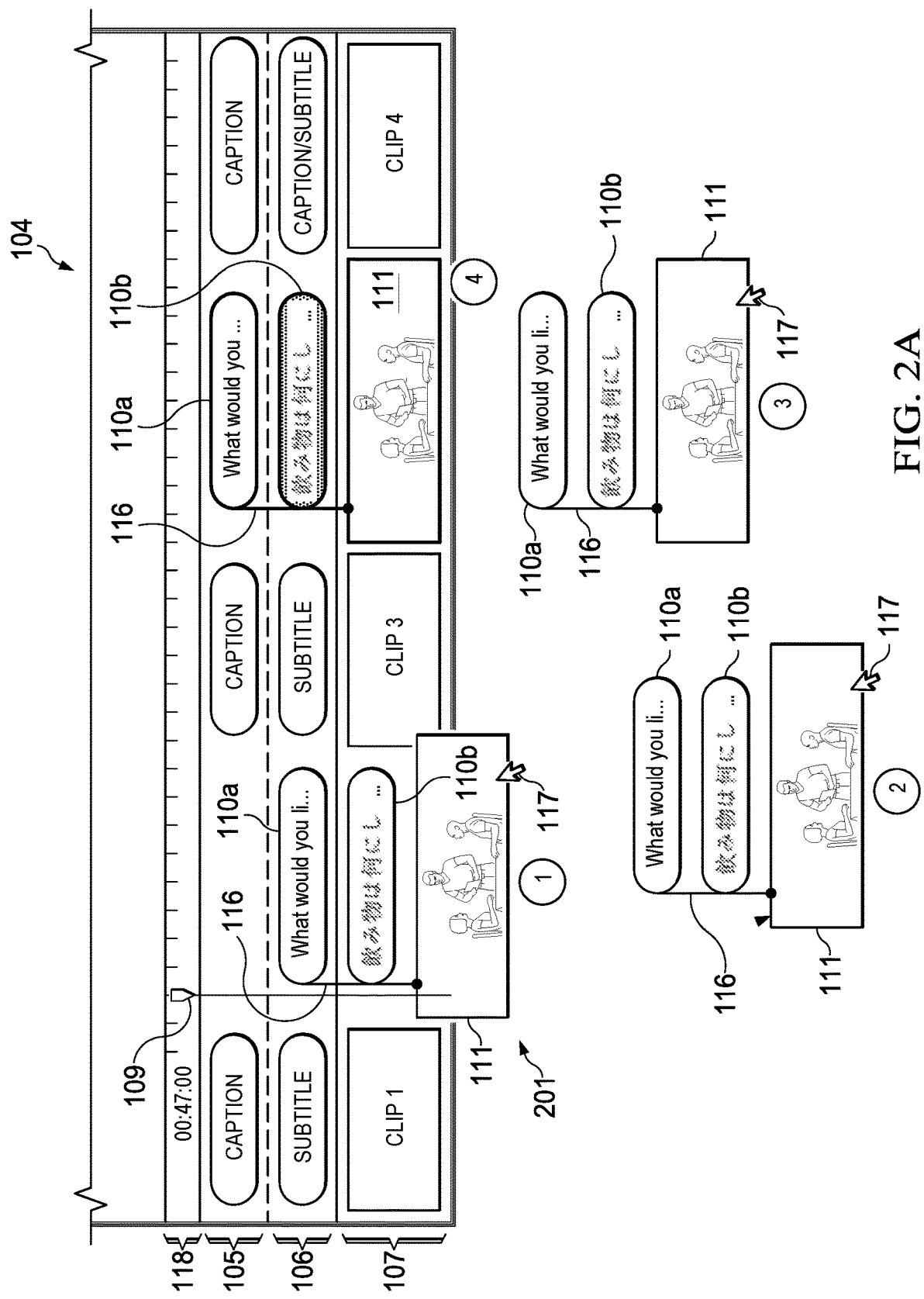
FIG. 2A illustrates moving a media object anchored to caption and subtitle objects to a new position in the timeline of FIG. 1, according to an embodiment.

FIG. 2A illustrates moving a media object (e.g., a video clip) anchored to caption and subtitle objects to a new position in the timeline of FIG. 1, according to an embodiment. The numbers in the circles illustrate various locations during a drag 'n drop operation. In the example shown, the user selected video clip 111 and dragged together the anchored subtitle object 110b, video clip 111 and audio clip 112 (indicated by dashed outlines) to a new position in lane 107 between video clips 3 and 4. In an embodiment, video clips 3 and 4 automatically move apart in lane 107 to provide an opening to insert video clip 111. Because caption and subtitle objects 110a, 110b are anchored to video clip 111 these objects move with video clip 111 to its new position in lane 107, where they settle in their respective caption and subtitle lanes 105, 106.

Figure 2B:
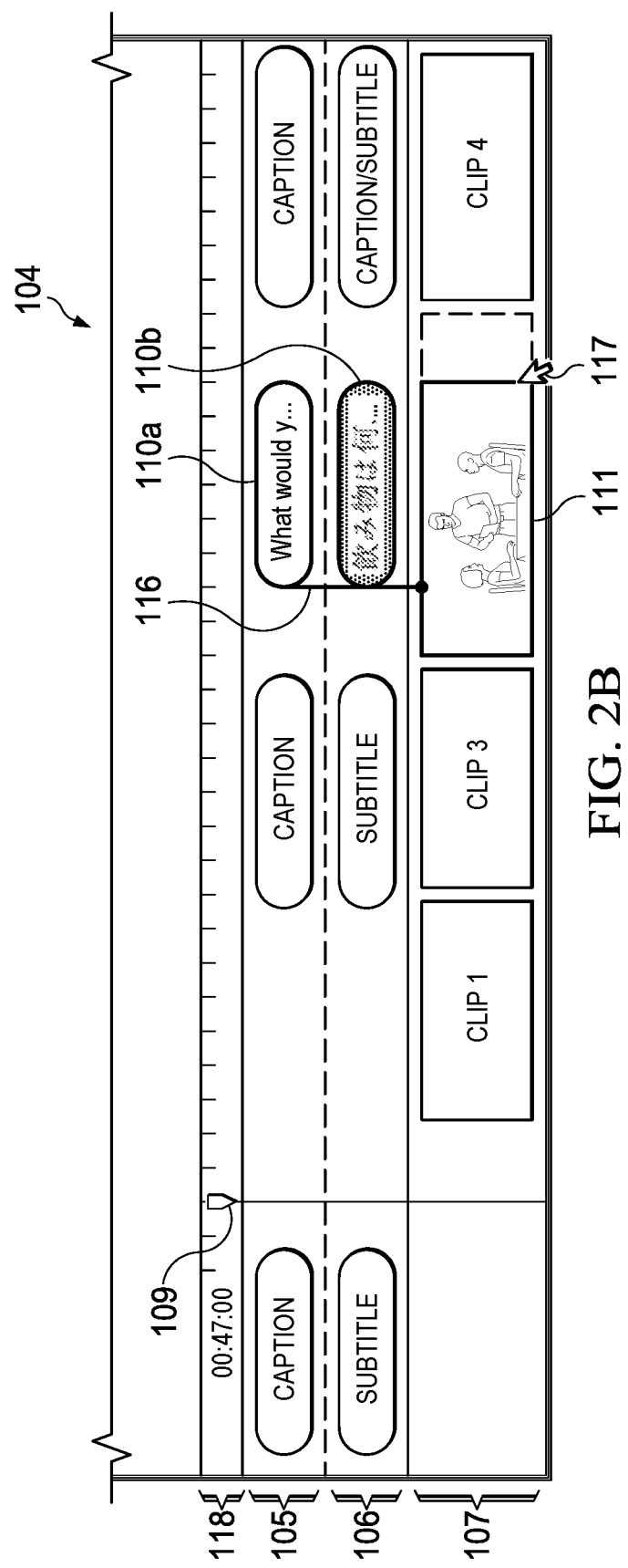
FIG. 2B illustrates determining a time range within a media object anchored to a subtitle object and then conforming the length or format of a caption or subtitle text string to the time range, according to an embodiment.

FIG. 2B illustrates determining a time range within a media object anchored to the subtitle clip and conforming the length or format of subtitle text to the time range, according to an embodiment. In the example shown, the user has selected a time range within video clip 111 using cursor 117. In response to the user selected time range within the video clip, an editing interface is displayed that allows the user to manually enter a time range, and the caption/subtitle fills that time range. In an embodiment, a caption/subtitle object is removed from timeline 104 when the time range of its corresponding video clip is trimmed so that the caption/subtitle object is no longer in the new time range. If the user subsequently lengthens the time range of the video clip, the caption/subtitle reappears in its original position in timeline 104.

Figure 2C:
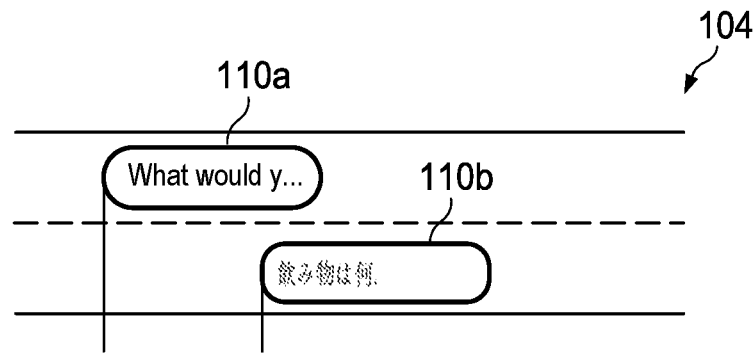
FIGS. 2C-2E illustrate combining anchored captions/subtitles into a single multiple-line caption/subtitle, and splitting multiple-line captions/subtitles into one anchored caption/subtitle per line, according to an embodiment.
Figure 2D:
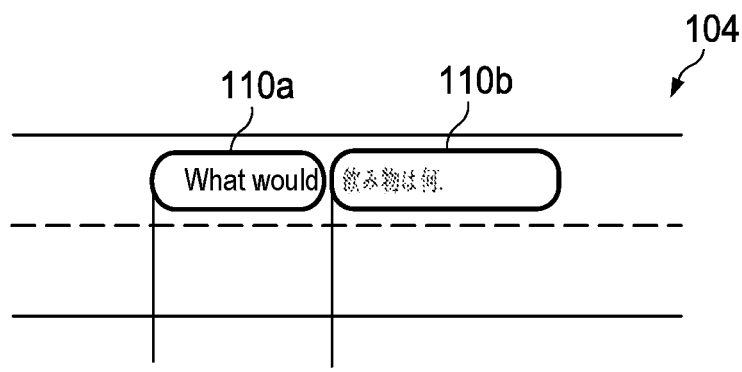
Figure 2E:
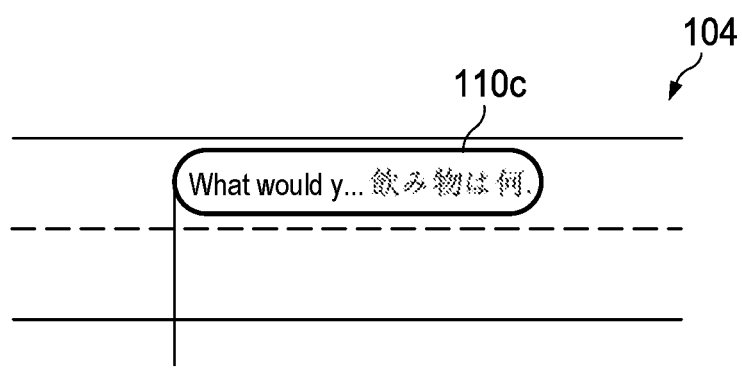

FIGS. 2C-2E illustrate combining anchored captions/subtitles into a single multiple-lane caption/subtitle, and splitting multiple-lane captions/subtitles into one anchored caption/subtitle per lane. Referring to FIG. 2C, anchored captions 110a and 110b are overlapping in time in timeline 104. To resolve the overlap, the user can right-click on captions 110a, 110b and select a "Resolve Overlap" command from a context menu, or the user can use a shortcut key or gesture to resolve the overlap. When the command is executed the tails of the overlapping captions 110a, 110b are trimmed. As shown in FIG. 2D, caption 110a is shortened so that it ends when caption 110b begins. In general, the start time of each caption 110a, 110b is respected, and its end time is adjusted so that it does not overlap the next caption's start time. Additionally, two captions can be joined into a single caption 110c using a "Join Captions" command, as shown in FIG. 2E. A single caption can also be split into two captions.

Examples of Caption/Subtitle Editing

Figure 3:
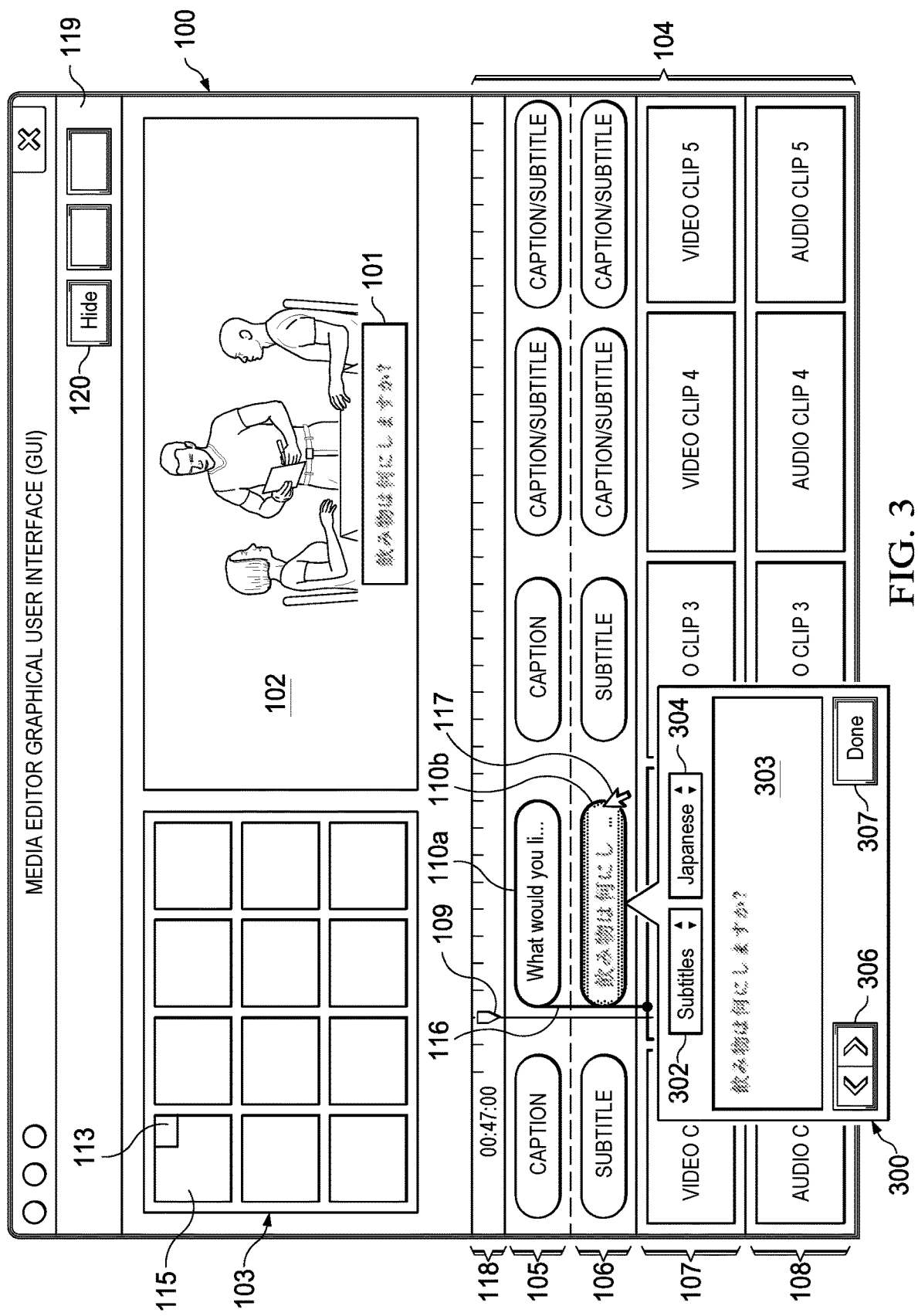
FIG. 3 illustrates a caption/subtitle editing interface for editing captions and subtitle objects, according to an embodiment.

FIG. 3 illustrates a captions/subtitle editing interface 300, according to an embodiment. Continuing with the previous example, if a user would like to edit subtitle object 110b she can do so by double clicking on subtitle object 110b with cursor 117 to invoke caption/subtitle editing interface 300, which in this example is a HUD. Editing interface 300 can also be invoked through other input means (e.g., a GUI affordance, a menu option, shortcut key, a touch gesture). In response to this user input, editing interface 300 is displayed in GUI 100 proximate to subtitle object 110b. Editing interface 300 includes text box 303, GUI affordances 302, 304 (e.g., a drop down menus) for changing the roles and subroles of the object. GUI affordance 306 also allows the user to scroll the text of the caption or subtitle. Done button 307 closes editing interface 300. An advantage of editing interface 300 is the user need not open a second window to edit caption or subtitle text, allowing the user to stay focused on her current editing activity in timeline 104.

Examples of Role/Subrole Editing

Figure 4:
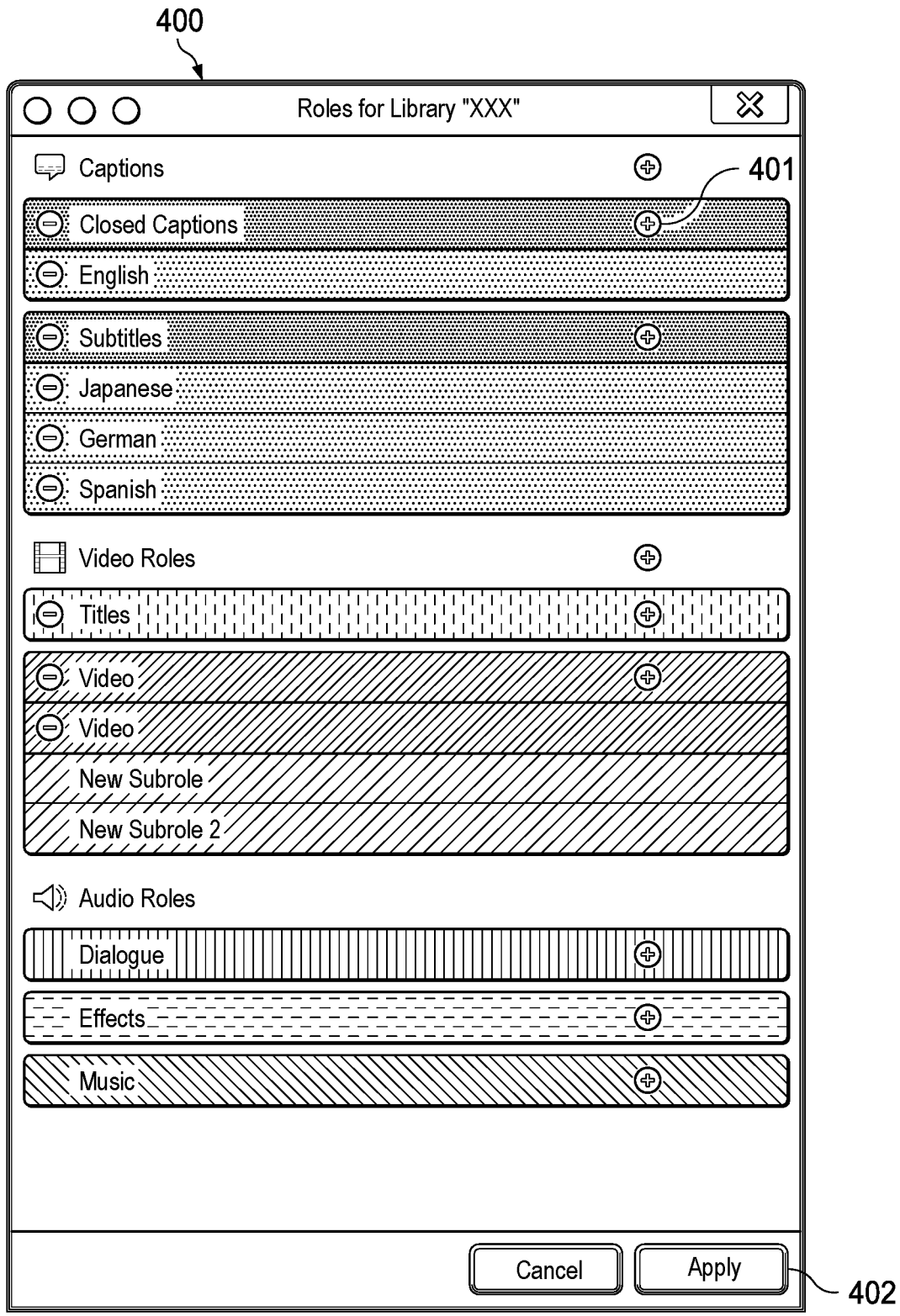
FIG. 4 illustrates a role editor for managing captions and subtitle roles and their respective subroles, according to an embodiment.

FIG. 4 illustrates a role editor 400 for managing captions and subtitle roles and their respective subroles, according to an embodiment. Roles are metadata text labels that the user can assign to objects in the event browser 103 or timeline 104. Roles and subroles allow a user to manage her editing workflow. The user can use roles to organize objects in events and projects, control the appearance of timeline 104, and export separate video or audio files (e.g., media stems) for broadcast delivery, audio mixing, or post-production. When the user imports objects (e.g., video, audio, captions, subtitles) into the media editing application, the object metadata is analyzed by the media editing application to assign one of multiple default roles to the video and audio components of each object, including for example, video, titles, dialogue, music and effects.

In the example shown, a video role includes the subroles titles and video, an audio role includes the subroles dialogue, sound effects and music, and the caption role includes the subroles captions and subtitles. The caption role has a subrole of English, and the subtitle subrole has multiple language subroles, including Japanese, German and Spanish. By clicking or touching GUI affordance 401 (shown as a button with a plus sign) for the desired role or subrole, the user can add additional roles or subroles. When the user is done using the role editor 400, the user can select GUI affordance 402 to apply the changes or cancel out of role editor 400.

Figure 5B:
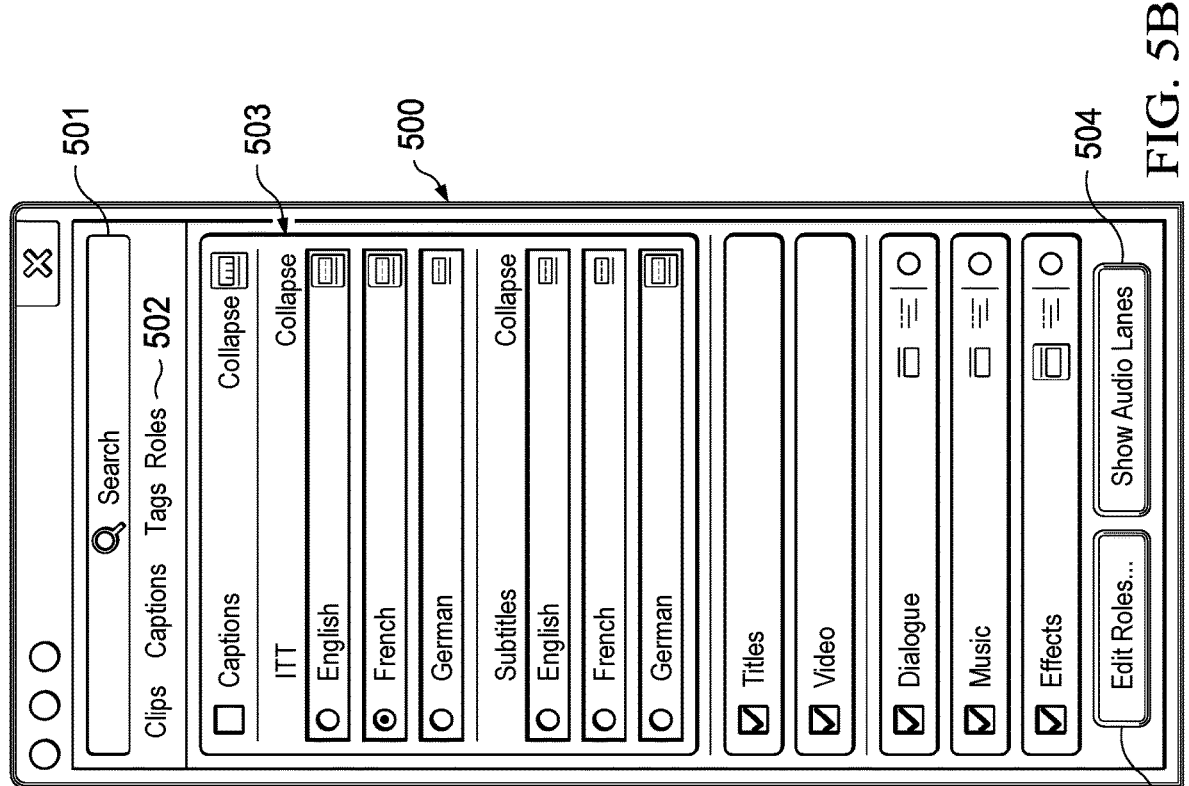
FIGS. 5A and 5B illustrate a timeline index view of caption and subtitle objects, according to an embodiment.
Figure 5A:
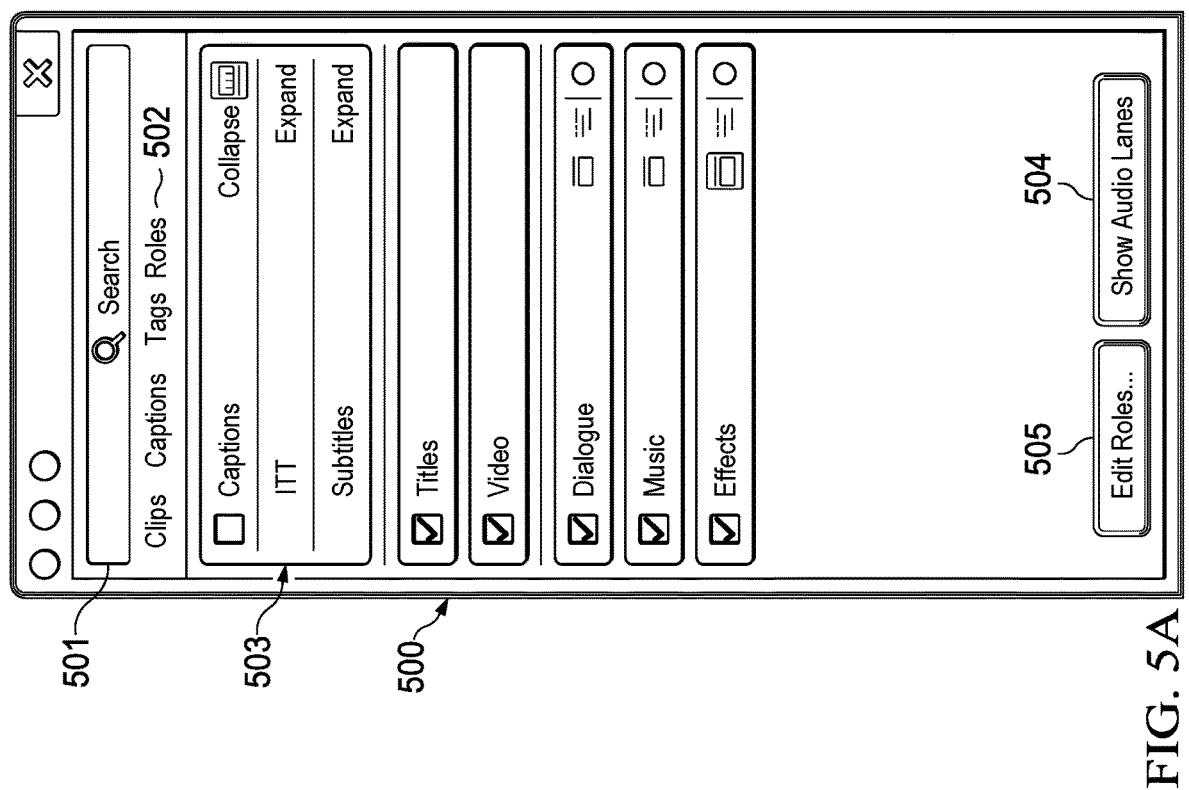

FIGS. 5A and 5B illustrate a timeline index view of caption and subtitle objects, according to an embodiment. Referring to FIG. 5A, timeline index view 500 is a table view displaying cells of information for objects in timeline 104. View 500 includes search field 501 to search for objects in timeline 104 and navigator 501 for selecting one of media objects (e.g., video or audio clips), captions/subtitle objects, tags and roles. In the example shown, the "Roles" option is selected in navigator 501, displaying a list of roles in timeline 104. Caption cell 503 is shown expanded to expose captions and subtitle subroles. Also shown are the default roles for titles, video, dialogue, music and effects. The user can select a role name in the list to highlight all caption and subtitle objects in timeline 104 with that role assigned. To turn a role on or off in timeline 104, the user can select or deselect the checkbox next to the role name. When a role is turned off, the user cannot see or hear caption or subtitle objects with that assigned role when the user plays back the media project. GUI Affordance 504 results in the audio lanes in timeline 104 being displayed and GUI affordance 505 invokes the role editor shown in FIGS. 6A and 6B.

Referring to FIG. 5B, the caption and subtitle subroles options are expanded to reveal language subroles. In this example, under the captions subrole there are English, French and German language subroles, and under the subtitles subrole there are also English, French and German language subroles.

Figure 6B:
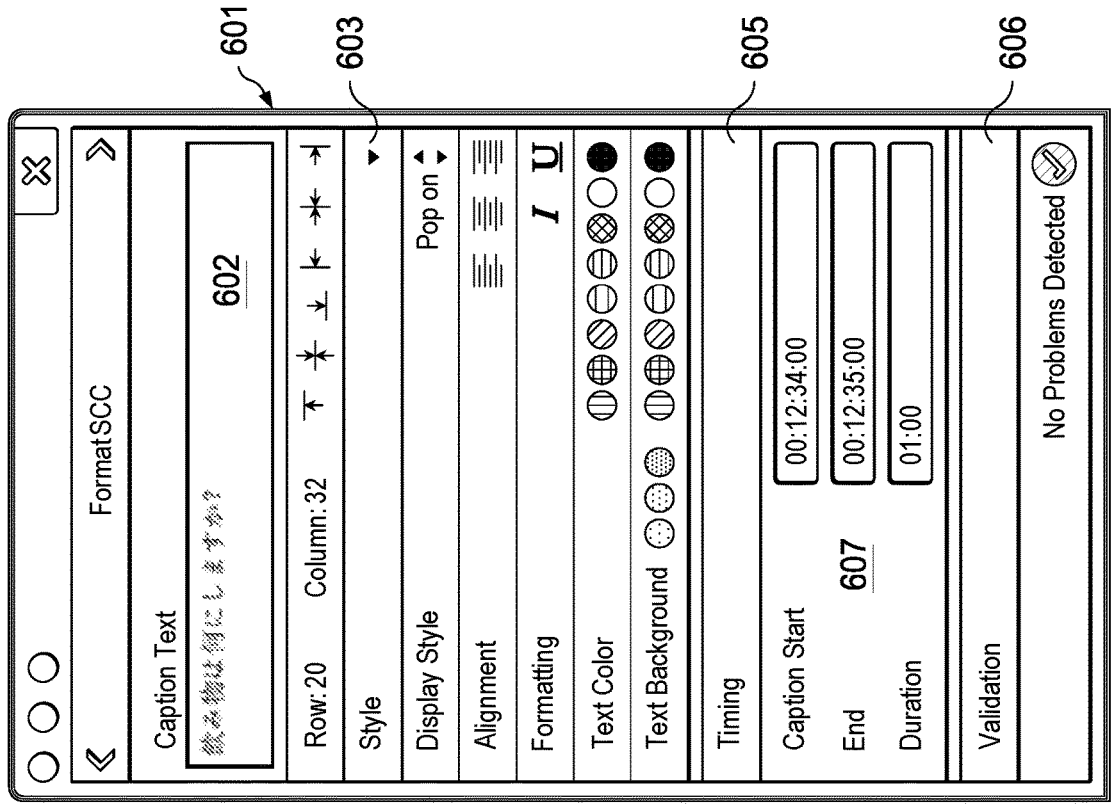
FIGS. 6A and 6B illustrate views for editing roles and subroles for caption and subtitle objects, according to an embodiment.
Figure 6A:
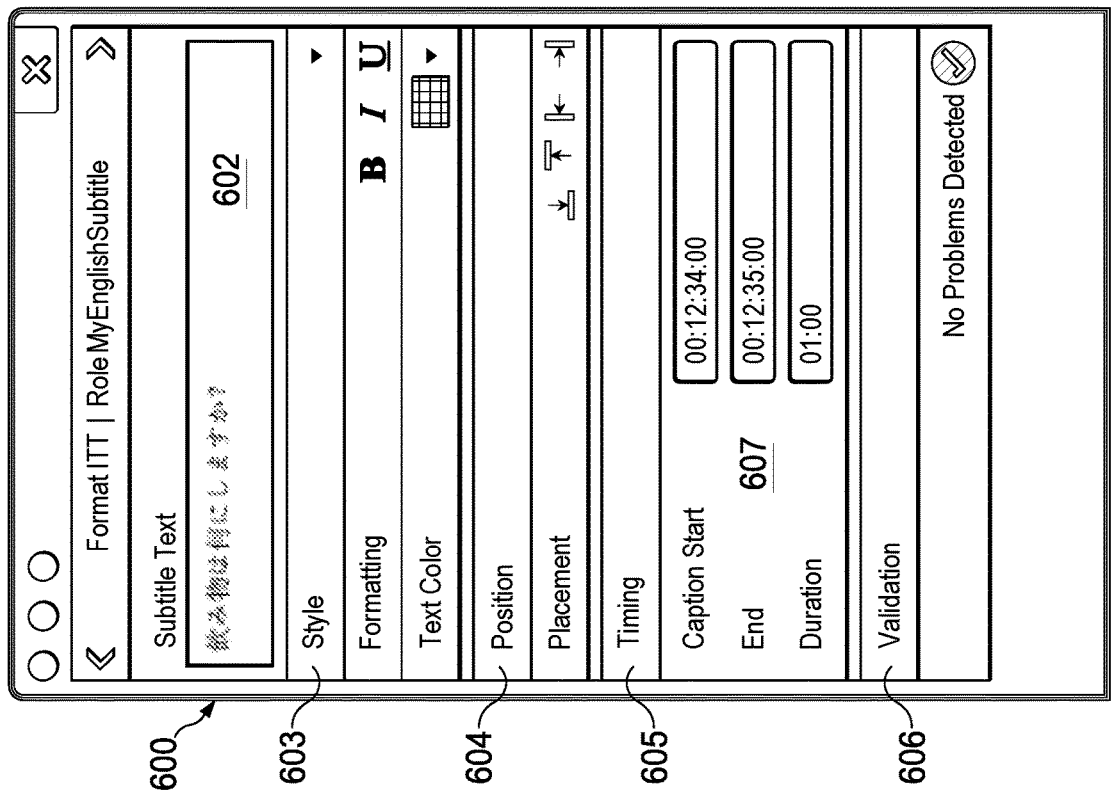

FIGS. 6A and 6B illustrate views for editing roles, according to an embodiment. In an embodiment, if the user selects GUI affordance 505 when the subtitle or subrole is highlighted, role editor interface 600 is invoked. If the user selects GUI affordance 505 when the caption subrole is highlighted, role editor interface 600 is invoked. The role editor interfaces can also be invoked by other input methods and from other interfaces in GUI 100 (e.g., shortcut keys, gestures).

Referring to FIG. 6A, role editor interface 600 includes text box 602 for entering subtitle text, style controls 603, position controls 604, timing controls 605 and verification results window 607 for displaying verification errors, if any, that occurred as a result of subtitle text edits, as described in further detail in reference to FIGS. 7A and 7B. The controls are relevant to subtitle formats, such as ITT files. Some examples of style controls 603 include formatting and text color. An example position control 604 is text placement. Some example timing controls 605 include fields 607 for entering timecodes for the start, stop and duration of the display of a subtitle overlaid on corresponding video, such as subtitle 110*b* displayed in viewer 102 of FIG. 1.

Referring to FIG. 6B, role editor interface 601 includes text box 602 for entering caption text, style controls 603, timing controls 605 and verification results window 607 for displaying verification errors, if any, that occurred as a result of caption text edits. The controls are relevant to closed caption formats, such as CEA-608 files. Some examples of style controls 603 include display style, text alignment (e.g., centered, left aligned, right aligned), formatting, text color and text background. Some examples of timing controls 605 include fields 607 for entering timecodes for caption start, stop and duration.

FIGS. 7A and 7B illustrate views for displaying verification results, according to an embodiment. In an embodiment, the media editing application analyzes caption and subtitle text to ensure the text complies with certain standard formats, such as ITT for subtitles and CEA-608 for closed captions. Some examples of verification errors that are monitored include overlapping captions or subtitles in timeline 104, caption text exceeding an allowable number of characters and caption text using invalid characters (e.g., Emojis). For example, CEA-608 only allows 32 characters in a caption text string. If there is a violation of a format rule, the verification error is displayed in window 700. Window 700 can be invoked by selecting the "Captions" option in navigator 501 or by other input means (e.g., menu option, shortcut key, gesture).

Examples Format Verification

Referring to FIG. 7A, icons and text string snippets are shown in a first column. The rows including text strings with verification errors are highlighted in the first column (e.g., highlighted in red). The second and third columns display start and end timecodes for displaying the caption text strings. Although the "Captions" option is selected, this option allows the user to work with text strings for captions or subtitles. The user can click the error icons 702, 703 to expose further detail regarding the verification errors. When selected, GUI affordance 704 causes only the text string associated with verification errors to be displayed, as shown in FIG. 7B, which also shows a third caption text string verification error 706. GUI affordance 705 will invoke the display of all caption or subtitle text strings in timeline 104 as shown in FIG. 7A.

Example Post-Production Application

Figure 8:
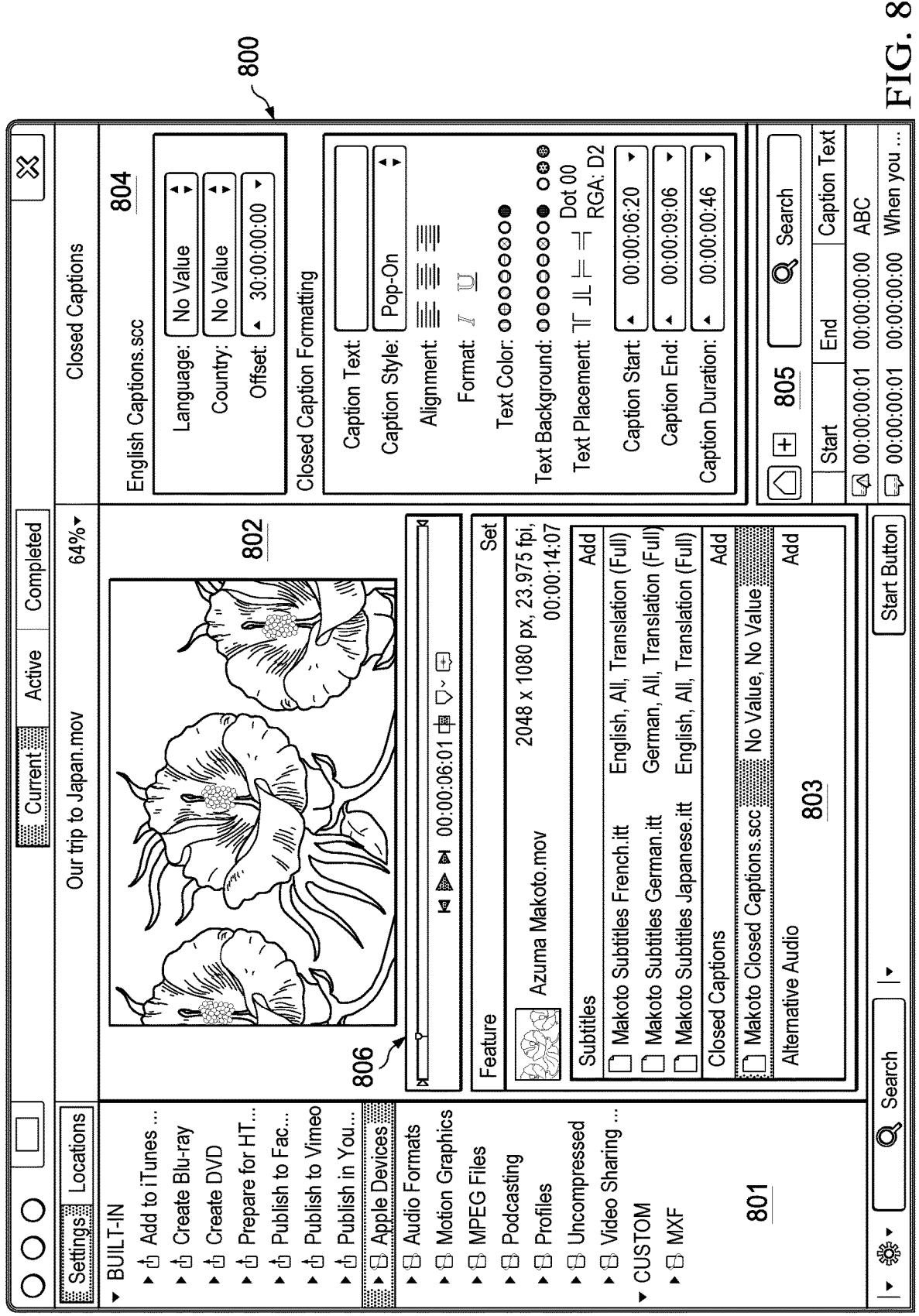
FIG. 8 is a GUI of a post-production transcoding application that allows for searching an editing of caption and subtitle text in a media project, according to an embodiment.

FIG. 8 is a GUI 800 of a post-production transcoding application that allows for searching and editing of captions and subtitles in a completed media project, according to an embodiment. GUI 800 can be part of a post-production transcoding application that provides editing (e.g., resizing, cropping, image processing), encoding, and delivery options, and offers batch processing, variable bit rate (VBR) options and H.264 encoding. The user can specify and save transcode settings, use filters and specify destinations for the output media. The post-production transcoding application can also provide a variety of output formats (e.g., DVD, web, CD and kiosk).

Settings tab 801 contains file format, filter, and geometry settings for transcoding a project. Preview window 802 is used to display the content of a source media file in its original form. Content window 803 is used to display the transcoded content of an output media file. Caption/subtitle editing interface 804 allows a user to edit caption and subtitle objects (see FIGS. 6A, 6B). Search engine 805 is used for searching for caption or subtitle objects in the media project based on, for example, timecodes or text terms. Transport controls 806 are for controlling playback of the media project in preview window 802. Content window 803 lists three subtitle files associated with the project, including subtitle files for French, German and Japanese languages. Search engine 805 allows searching for caption and subtitle objects in the media project based on text terms and timecodes, and also highlights caption and subtitle verification errors, as previously described in reference to FIGS. 7A and 7B. A filtering GUI affordance (e.g., a virtual button, shortcut key, gesture) allows for display of only those captions and subtitles associated with verification errors, as previously described with respect to FIG. 7B.

Example Data Structures

Figure 9:
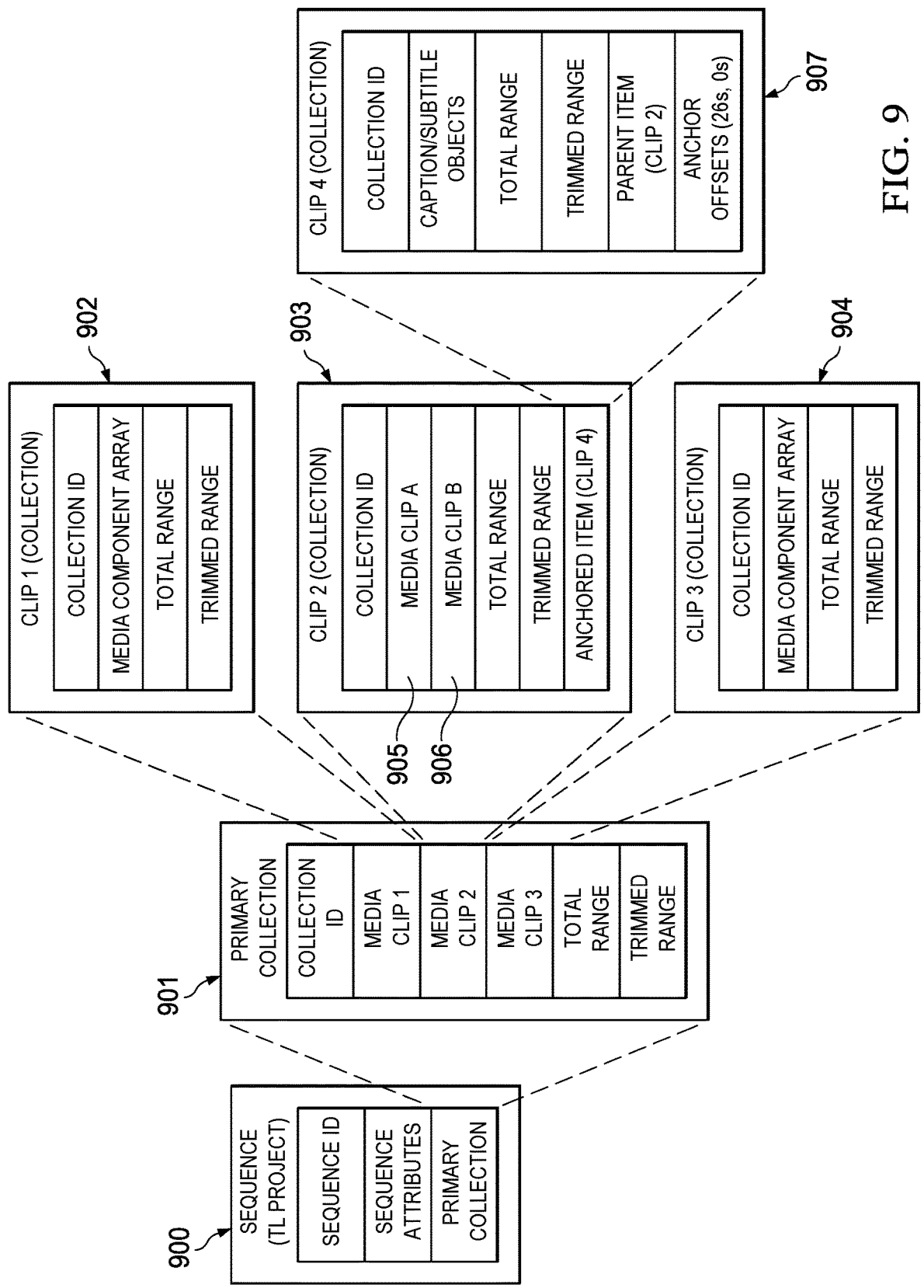
FIG. 9 illustrates a nested data structure for anchoring caption and subtitle objects to media objects, according to an embodiment.
Figure 10:
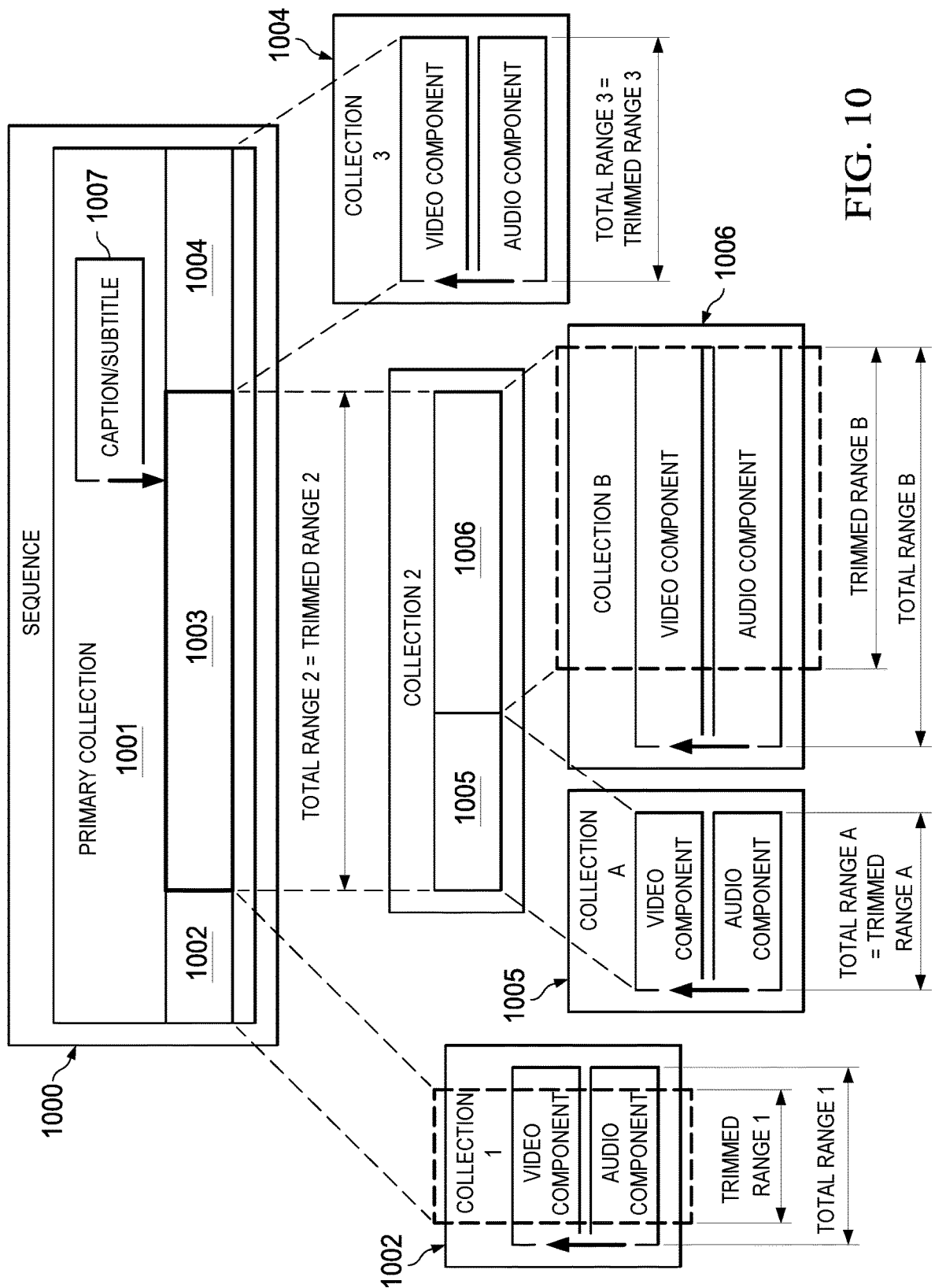
FIG. 10 illustrates media objects and caption and subtitle objects nested in a timeline, according to an embodiment.

FIG. 9 illustrates a nested data structure for anchoring caption and subtitle objects to media objects, according to an embodiment. At the top of a nested data structure is sequence object 900 storing data for a sequence of media objects on timeline 104. Sequence object 900 includes a sequence ID uniquely identifying a sequence of media objects in timeline 104 (as shown in FIG. 10), sequence attributes and a primary collection pointer or link to primary collection object 901 (Clip 1). In an embodiment, a user can set the sequence attributes (e.g., project name, starting timecode, video format, resolution and rate, number of audio channels, etc.) when creating a project in timeline 104. Primary collection object 901 includes collection ID identifying the collection, total range, a trimmed range and a media component array that, in this example, includes media clips 902, 903, 904 (also referred to as media clips 1-3). Media clips 902, 903, 904 are media objects that store data and links for various types of content, including video and audio data. In some embodiments, the media component array is ordered based on the position of media objects 902, 903, 904 in timeline 104, and only includes media objects in the primary lane associated with primary collection object 901, as shown in FIG. 10. The media editing application assumes that there is no gap between media objects 902, 903, 904 in timeline 104, and thus no timing data is needed between media objects 902, 903, 904.

Media objects 902, 903, 904 each include a collection ID, a total range and a trimmed range. Media objects 902 and 904 are associated with individual media objects that have been added to timeline 104 from, for example, event browser 103, and thus do not themselves include collections of other media objects. Similar to primary collection object 901, the data structures of media objects 902, 904 include a collection ID, total and trimmed ranges, and a media component array (e.g., a video component, one or more audio components). Media object 903 is a compound clip and therefore includes multiple media objects in addition to the collection ID, total and trimmed ranges. Specifically, media object 903 includes two media objects 905 and 906. Because media component objects are both nested within primary collection object 901, media component objects 905, 906 (media clips A and B) are both in the primary lane of primary collection object 901, and media object 906 follows media component object 905 in the primary lane, as shown in FIG. 10. Data structures for media objects 905, 906 are not shown in FIG. 9, but each of media objects 905, 906 has data structure that is similar to the data structure of primary collection object 901 in that media objects 905, 906 also include media component array.

In addition, the data structure of media component object 903 includes a set of one or more anchored items (in this case only the one item, media object 907). The parent item references (e.g., through a pointer) the parent media object (media object 903). The anchor offset stored in media object 907 indicates that media object 907 is anchored 26 seconds into its parent media object 903, and that the anchor is at the start of parent media object 903. These times can refer to the trimmed ranges of the media objects.

In an embodiment, media object 907 is a caption or subtitle object that is anchored to media object 903. Multiple captions or subtitle objects can be anchored to media object 903 and each would have an anchored item in the parent object 903 and anchor offsets in the caption/subtitle object. For example, multiple subtitles objects storing text in different languages can be anchored to parent media object 903, as described in reference to FIG. 1 and FIG. 10.

FIG. 10 illustrates the anchoring relationships between the various clips as well as the durations (ranges) of the clips. Media objects 902, 904, 905, 906 each has an audio component anchored to a video component. While each of the media objects shown has a single audio component, one of ordinary skill will recognize that some embodiments will have multiple audio components (e.g., if a camera records several audio tracks as separate files and imports the files with a video file as part of a single clip). Media object 907 (a caption or subtitle object) is shown anchored to media object 903. In some cases, multiple media objects will be anchored to the same primary lane media object, and the multiple anchored media objects may overlap in time. As shown in FIG. 1, multiple caption and subtitle media objects can be anchored to the same primary lane media object (e.g., a video object).

In an embodiment, lane numbers are assigned to each media object that indicates the lane of the media object within the collection. In an embodiment, all of the primary lane objects are assigned a lane number of zero, with lanes above the primary lane getting increasing numbers and lanes below the primary lane getting decreasing (negative) numbers. For instance, a separate audio clip might be anchored to a video clip in the primary lane and displayed below the primary lane. In this case, within primary collection object 901, anchored media object 907 has a lane number of 1. The lane numbers indicate compositing order for video in some embodiments. Whereas two audio files can be combined fairly easily (mixed), two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc., that combine pixel information of two images, as well as effects such as scaling the top image to get a picture-in-picture, applying a color mask to the top image, etc.).

The items in a lower-level nested collection will also have lane numbers that refer to their lane order within that collection. For example, media object 903 has two media objects 905, 906, that each has a lane number of zero. However, this collection object could have anchored objects in multiple lanes. For the purpose of compositing at time of rendering, the items within media object 903 would be composited initially according to the ordering within media object 903, and the output of that composite would be composited within primary collection object 901 according to the ordering of primary collection object 901. Similarly, for each of the lowest-level media objects (e.g., media object 902), the video clips are all lane zero and the audio clips are lane −1.

FIG. 10 also illustrates the ranges (e.g., durations) of the various media objects. Media object 1002 is trimmed on both sides and the start of media object 1006 is trimmed. For media object 1003, the total range is the sum of the trimmed ranges of its primary lane clips, which in this case are media objects 1005 and 1006. Thus, the variable Total Range 2=Trimmed Range A+Trimmed Range B. In this case, the media object 1003 is not separately trimmed, such that its trimmed range equals its total range. This means that, although there is more media within media object 1006, while editing the primary collection object 1001 the media editing application will not allow a user to increase the duration of media object 1003 beyond that of Total Range 2. However, a user could open up the media object 1003 in timeline 104 and apply trim edits to either of media objects 1005 and 1006. Modifications to the trimmed range of these objects will affect the total range of the media object 1003. In addition, within the primary collection object 1001, a user can modify the trimmed range of media object 1003 to shorten the clip. Trimming from the beginning would result in less of the media of media component object 1005 being used in the composite presentation, while trimming from the end would result in less of the media of media object 1006 being used in the composite presentation.

Example Process Flows

Figure 11:
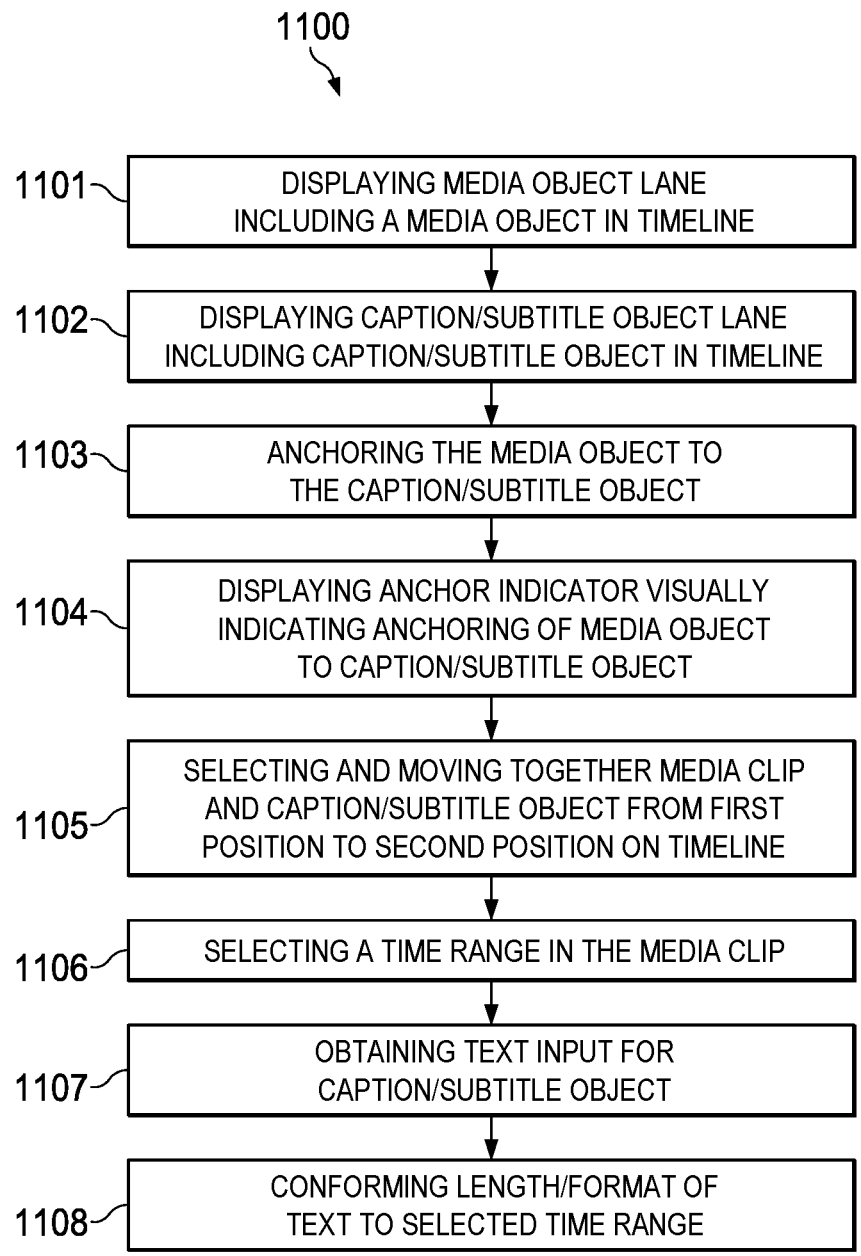
FIG. 11 is a flow diagram illustrating editing processes performed on captions and subtitle objects, according an embodiment.

FIG. 11 is a flow diagram illustrating editing processes performed on captions and subtitles, according an embodiment. Process 1100 can be implemented by, for example, the media editing application and electronic system architectures described in reference to FIGS. 12 and 13.

Process 1100 can begin by causing to display in a timeline of, for example, a media editing application, a first lane including a media object (1101). Process 1100 can continue by causing to display in the timeline a second lane including a caption or subtitle object (1102). Process 1100 can continue by anchoring the media object to the caption or subtitle object (1103), and causing to display an anchor indicator, visually indicating the anchoring of the media object to the caption or subtitle object in the timeline (1104), as described in reference to FIG. 1.

In an embodiment, process 1100 can continue by selecting and moving together the media object and caption/subtitle object from a first position in the timeline to a second position in the timeline (1105), as described in reference to FIG. 2A.

Example Media Editing Application Architecture

Figure 12:
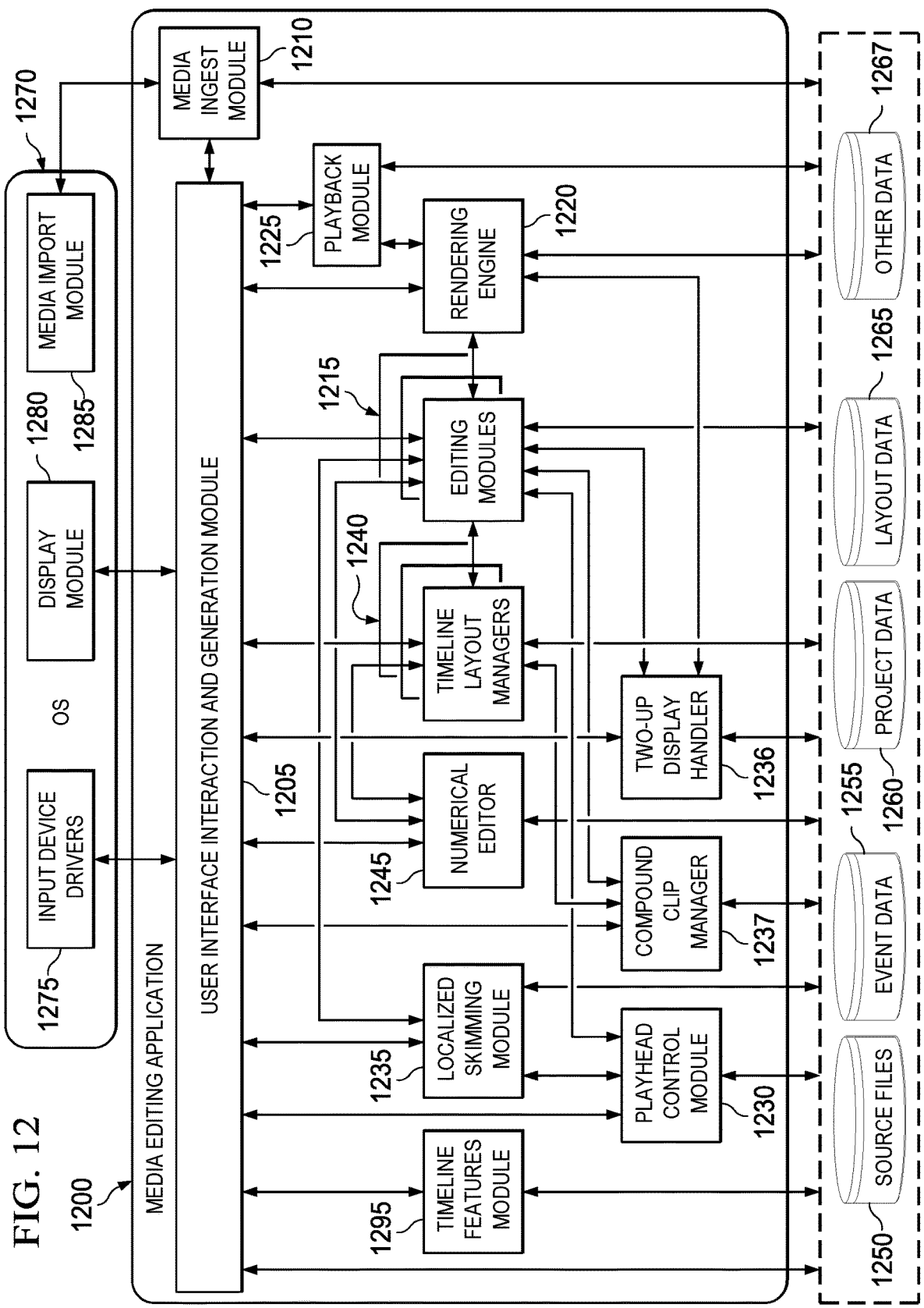
FIG. 12 is a block diagram of media editing application implementing the features and processes described in reference to FIGS. 1-11, according to an embodiment.

FIG. 12 is a block diagram of media editing application architecture implementing the features and processes described in reference to FIGS. 1-11, according to an embodiment. In some embodiments, the processes described above are implemented as software running on a particular machine, such as a computer or a handheld device, or stored in a machine-readable medium. FIG. 12 conceptually illustrates the software architecture of media editing application 1200. In some embodiments, media editing application 1200 is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Media editing application 1200 includes user interface (UI) interaction and generation module 1205, media ingest module 1210, editing modules 1215, rendering engine 1220, playback module 1225, timeline features module 1295, playhead control module 1230, localized skimming module 1235, numerical editor 1245, two-up display handler 1236, and compound clip manager 1237. FIG. 12 also illustrates stored data associated with media editing application 1200: source files 1250, events data 1255, project data 1260, layout data 1265, and other data 1267 (e.g., render files). In some embodiments, source files 1250 store media files (e.g., video files, audio files, combined video and audio files, etc.) imported into the application. Source files 1250 can also store transcoded versions of the imported files as well as analysis data (e.g., people detection data, shake detection data, color balance data, etc.). Events data 1255 stores the events information used by some embodiments to populate the clip library and clip browser. The events data may be a set of clip object data structures stored as one or more SQLite database files (or other format) in some embodiments. Project data 1260 stores the project information to specify a composite presentation in the timeline. Project data 1260 may also be a set of clip object data structures stored as one or more SQLite database files (or other format) in some embodiments. Layout data 1290 stores layout information (e.g., coordinates, length, width, lane numbers, etc.) of all clips that are displayed in the timeline. In some embodiments, layout data 1267 is part of project data 1260. Render files 1267 include thumbnail-sized images for display in the clip browser or timeline, audio waveform displays for media objects, as well as rendered segments of a timeline sequence for use in playback. In an embodiment, data sets 1250, 1255, 1260, 1265, 1267 are stored in a single physical storage device (e.g., an internal hard drive, external hard drive, etc.). In an embodiment, the data sets may be split between multiple physical storage devices. For instance, the source files might be stored on an external hard drive with the events data, project data, and render files on an internal drive. In an embodiment, the events data is stored with their associated source files and render files in one set of folders, and the project data with associated render files in a separate set of folders.

FIG. 12 also illustrates operating system 1270 that includes input device driver(s) 1275, display module 1280, and media import module 1285. In some embodiments, as illustrated, device drivers 12875, display module 1280, and media import module 1285 are part of the operating system, even when the media editing application 1200 is an application separate from the operating system.

Input device drivers 1275 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 1205.

The present application describes one or more GUIs that provide users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Display module 1280 translates the output of a user interface for a display device. That is, display module 1280 receives signals (e.g., from UI interaction and generation module 1205) describing what should be displayed and translates these signals into pixel information that is sent to the display device. The display device may be an LCD, plasma screen, CRT monitor, touchscreen, etc.

Media import module 1285 receives media files (e.g., audio files, video files, etc.) from storage devices (e.g., external drives, recording devices, etc.) through one or more ports (e.g., a USB port, Firewire® port, Thunderbolt® etc.) of the device on which the application 1200 operates and translates this media data for the media editing application or stores the data directly onto a storage of the device.

The UI interaction and generation module 1205 of the media editing application 1200 interprets the user input data received from the input device drivers and passes it to various modules, including media ingest module 1210, editing modules 1215, rendering engine 1220, playback module 1225, timeline features module 1295, playhead control module 1230, localized skimming module 1235, numerical editor 1245, two-up display handler 1236, compound clip manager 1237 and timeline layout managers 1240. UI interaction module also manages the display of the UI, and outputs this display information to display module 1280. This UI display information may be based on information from editing modules 1225, playback module 1225, timeline features module 1295, playhead control module 1230, localized skimming module 1235, numerical editor 1245, two-up display handler 1236, compound clip manager 1237 and data sets 1250, 1255, 1260, 1265, and 1267.

Media ingest module 1210 manages the import of source media into the media editing application 1200. Some embodiments, as shown, receive source media from media import module 1285 of operating system 1270. Media ingest module 1210 receives instructions through UI module 1205 as to which files should be imported, then instructs media import module 1285 to enable this import (e.g., from an external drive, from a camera, etc.). Media ingest module 1210 stores these source files 1250 in specific file folders associated with the application. In an embodiment, media ingest module 1210 also manages the creation of event data structures upon import of source files and the creation of the clip and asset data structures contained in the events.

Editing modules 1215 include a variety of modules for editing media in the event browser as well as in the timeline. Editing modules 1215 handle the creation of projects, addition and subtraction of media objects from projects, trimming or other editing processes within the timeline (e.g., inserting, deleting, anchoring, appending, etc.), application of effects and transitions, or other editing processes. In some embodiments, editing modules 1215 create and modify project and object data structures in both event data 1255 and project data 1260. Moreover, editing modules 1215 work with timeline layout managers 1240 to manage the layouts of the objects and effects (e.g., transitions) displayed in the timeline.

Rendering engine 1220 handles the rendering of images for the media editing application. In some embodiments, rendering engine 1220 manages the creation of images for the media editing application. When an image is requested by a destination within the application (e.g., playback module 1225), rendering engine 1220 outputs the requested image according to the project or event data. Rendering engine 1220 retrieves the project data or event data that identifies how to create the requested image and generates a render graph that is a series of nodes indicating either images to retrieve from the source files or operations to perform on the source files. In an embodiment, rendering engine 1220 schedules the retrieval of the necessary images through disk read operations and the decoding of those images.

Playback module 1225 handles the playback of images (e.g., in a preview display area of the user interface. Some embodiments do not include playback module and rendering engine 1220 directly outputs its images to UI module 1210 for integration into the GUI, or directly to display module 1280 for display at a particular portion of the display device.

In some embodiments, rendering engine 1220 performs various operations to generate an output image. In some embodiments, these operations include blend operations, effects (e.g., blur or other pixel value modification operations), color space conversions, resolution transforms, etc. In some embodiments, one or more of these processing operations are actually part of the operating system and are performed by a GPU or CPU of the device on which media editing application 1200 operates. The output of rendering engine 1220 (a rendered image) may be stored as render files in storage 1265 or sent to a destination for additional processing or output (e.g., playback).

Timeline layout managers 1240 manage the layouts of the objects and effects (e.g., transitions) displayed in the timeline. For instance, the layout managers 1240 update layout data 1265 as media objects in the timeline changes (e.g., by being edited, moved, deleted, etc.). Timeline layout managers 1240 interact with editing modules 1215 to receive editing operations performed on the items displayed in the timeline. Timeline layout managers 1240 also interact with numerical editor 1245 as well to get any editing updates. In some embodiments, each timeline layout manager has a one-to-one relationship with the timeline in managing the layouts of the objects that are in the timeline or anchored to objects in the timeline. When the timeline displays inside of a compound object, a new layout manager may be associated with that particular state of timeline to manage the media objects within the compound object. As described above, timeline layout managers 1240 may work with editing modules 1215 in managing the layouts of the objects displayed in the timeline.

Timeline features module 1295 handles various features of the timeline in some embodiments provide. For instance, timeline features module 1295 manages the separation of audio and video portion of a media object displayed in the timeline. Timeline features module 1295 also controls the volume of a media object that has audio content. Moreover, timeline features module 1295 also handles the customization of the timeline and changes the ratio of the audio and video portions of each media object in the timeline. Timeline features module 1295 also communicates with timeline layout managers 1240 and editing modules 1215 for handling any changes in the layouts of the clips in the timeline and editing operations performed by using the provided timeline features.

Playhead control module 1230 manages playheads in the timeline in some embodiments. Playhead control module 1230 communicates with editing modules 1215 to manage editing operations that are performed by using playheads. For instance, playhead control module 1230 works with editing modules 1215 for anchoring media objects based on the position of the primary playhead in the timeline.

Localized skimming module 1235 performs localized skimming. In some embodiments, localized skimming module 1235 communicates with playhead control module to receive information regarding playhead positions. Also, localized skimming module 1235 sends requests to rendering engine 1220 to produce appropriate frames and images to display based on the position of the playhead and cursor.

Numerical editor 1245 receives numerical inputs through UI interaction and generation module 1205 regarding the position of a media object, playhead, or other items in the timeline. Numerical editor 1245 precisely specifies the duration of a media object, accurately specifies the starting and/or ending point of a media object in the timeline, and specifies the location of a playhead, etc. In some embodiments, the numerical editor 1245 communicates with timeline layout managers 1240 and editing modules 1215 to facilitate the editing operations based on the received numerical inputs.

Two-up display handler 1236 in some embodiments communicates with editing modules 1215 to prepare requests to the rendering engine 1220 for generating two frames on or neighboring the edit point.

Compound object manager 1237 manages the creation and manipulation of compound objects. The compound object manager 1237 in some embodiments communicates with timeline layout managers 1240 and editing modules 1215.

While many of the features of media-editing application 1200 have been described as being performed by one module (e.g., UI interaction and generation module 1205, media ingest manager 1210, etc.), one of ordinary skill in the art will recognize that the functions described herein might be split up into multiple modules. Similarly, a single module (e.g., playback module 1225 might be part of UI interaction and generation module 1205) may implement the functions described as being performed by multiple different modules.

Example Electronic System Architecture

Figure 13:
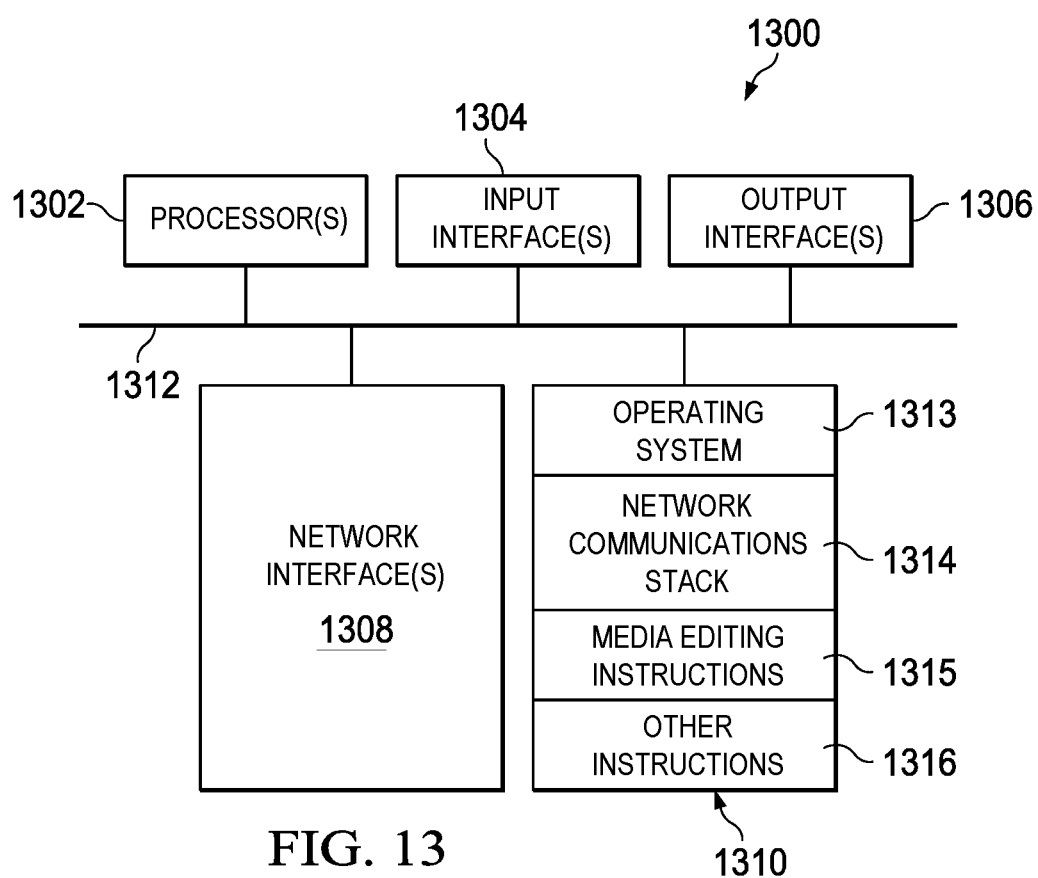
FIG. 13 is a block diagram of electronic system architecture for implementing the features and processes described in reference to FIGS. 1-12, according to an embodiment.

FIG. 13 is a block diagram of electronic system architecture for implementing the features and processes described in reference to FIGS. 1-12, according to an embodiment. Other architectures are possible, including architectures with more or fewer components. In some implementations, architecture 1300 includes one or more processor(s), co-processors, video processors or graphics processing units 1302 (e.g., dual-core Intel® Xeon® processors), one or more network interface(s) 1306 (e.g., network interface card), one or more input interfaces 1304 (e.g., ports, connectors, I/O controllers) for connecting to various input devices (e.g., keyboard, mouse, trackball, touch surface, virtual keyboard), one or more output interfaces (e.g., ports, connections, display controllers) for connecting to various output devices 1305 (e.g., LED or LCD display, CRT, plasma, retina display) and computer-readable medium(s) 1310.

Computer-readable medium(s) 1310 include any storage medium or device that stores and provides instructions to processor(s) 1302 for execution, including without limitation, non-volatile media (e.g., optical or magnetic disks, ROM, flash memory) and volatile media (e.g., RAM). Computer-readable medium(s) 1308 can store computer program instructions for implementing operating system 1313 (e.g., OS X®, iOS®, Windows®, Linux, Unix, Android®), network communication stack 1314, media editing instructions 1315 and other instructions 1316. Media editing instructions 1315 include instructions for implementing a media editing application that includes the features and processes for editing captions and subtitles described in reference to FIGS. 1-12. Computer program instructions can be based on any suitable computer language (e.g., Objective-C, SWIFT, Java, Python, PHP, C#, JavaScript).

Operating system 1313 can be multi-user, multiprocessing, multitasking, multithreading, real time, etc. Operating system 1313 performs basic tasks, including but not limited to: recognizing input from devices 1304 and providing output to devices 1305; keeping track and managing files and directories on computer-readable medium(s) 1310; controlling peripheral devices; and managing traffic on the one or more communication channel(s) 1312. Network communications stack 1314 includes various components for establishing and maintaining network connections (e.g., software for implementing communication protocols, such as TCP/IP, HTTP, etc.).

Architecture 1300 can be included in any electronic system, including but not limited to: personal computers, server computers, notebook computers, smart phones and tablet computers. Architecture 1300 can be implemented in a parallel processing or peer-to-peer infrastructure or on a single device with one or more processors. Software can include multiple software components or can be a single body of code.

What is claimed is:

1. A method comprising:
    causing to display on a display device, by one or more hardware processors executing a media editing application, a graphical user interface (GUI) including a timeline;
    causing to display on the timeline, by the one or more hardware processors, an anchor lane including a media object;
    causing to display on the timeline, by the one or more hardware processors, a secondary lane including a first caption or subtitle object;
    causing to display on the timeline, by the one or more hardware processors, a third lane including a second caption or subtitle object, wherein the first caption or subtitle object includes text in a first language, and the second caption or subtitle object includes text in a second language that is different than the first language;
    anchoring, by the one or more hardware processors, the media object to the first caption or subtitle object in the timeline, wherein the anchoring comprises displaying an anchor indicator coupling the media object in the anchor lane and the first caption or subtitle object in the secondary lane, and wherein the anchoring enables the media object and the first caption or subtitle object to be concurrently manipulated as a single group of objects in the timeline;
    receiving, by the one or more hardware processors through an input interface, an input to move at least one of the media object or the first caption or subtitle object; and
    responsive to the input, causing, by the one or more hardware processors, the media object and the first caption or subtitle object to concurrently move together to a different position on the timeline.

2. The method of claim 1, further comprising:
    receiving, by the input interface, a second input; and
    responsive to the second input, causing the secondary lane to be hidden from view in the timeline.

3. The method of claim 1, further comprising:
    receiving, by the input interface, a first selection input directed to the media object;
    responsive to the first selection input, determining a time range in the media object;
    receiving, by the input interface, a caption or subtitle object editing input;
    responsive to the caption or subtitle object editing input, causing a caption or subtitle object editing interface to be displayed in the GUI; and
    receiving third text entry input entering text into a text field of the caption or subtitle object editing interface.

4. The method of claim 1, further comprising:
    receiving, by the input interface, a second input removing the anchor between the media object and the first caption or subtitle object;
    receiving, by the input interface, a third input selecting a second media object in the anchor lane;
    anchoring the first caption or subtitle object to the second media object; and
    causing to display a new anchor indicator on the timeline, the new anchor indicator visually indicating the anchoring of the first caption or subtitle object to the second media object.

5. The method of claim 1, further comprising:
    causing the first caption or subtitle object to be verified according to one or more formatting rules;
    determining that the first caption or subtitle object does not comply with at least one rule; and
    causing to display visual feedback in the timeline indicating a verification error.

6. The method of claim 5, wherein the verification error is caused by the first caption or subtitle object overlapping in time with at least one other caption or subtitle object in the secondary lane;
    receiving, by an input interface, input resizing one of the overlapping caption or subtitle objects;
    responsive to the resizing, determining that the verification error has been fixed; and
    causing to display visual feedback in the timeline indicating that the verification error has been fixed.

7. The method of claim 1, further comprising:
receiving a compound object including a plurality of caption or subtitle objects;
receiving, by the input interface, a second input;
responsive to the second input, extracting the plurality of caption or subtitle objects from the compound object; and
placing the extracted plurality of caption or subtitle objects in the secondary lane on the timeline.

8. The method of claim 7, further comprising:
causing to display in the GUI a compound object and a glyph or other visual indicator indicating that the compound object includes one or more caption or subtitle objects.

9. The method of claim 1, further comprising:
receiving, by the input interface, a second input; and
responsive to the second input, displaying a plurality of editing controls for editing the first caption or subtitle object.

10. The method of claim 1, further comprising:
receiving, by the input interface, a second input; and
responsive to the second input, displaying a plurality of roles and subroles that are assignable to the first caption or subtitle object, wherein the roles include user-selectable caption or subtitle formats for the caption or subtitle role, respectively, and the subroles include user-selectable language preferences for the first caption or subtitle object.

11. The method of claim 1, further comprising:
receiving, by the input interface, a second input; and
responsive to the second input, causing to display a second GUI that includes a preview window for playing back content of a project, a search engine configured to search for caption or subtitles in the project, a caption or subtitle editing interface for allowing a user to edit caption or subtitle objects, and a plurality of controls, the controls including transport controls for controlling playback of the content in the preview window, controls for causing the search engine to navigate through a plurality of captions or subtitles in the project based on at least one of timecodes or text terms, and editing controls for editing caption or subtitle objects in the second GUI.

12. The method of claim 11, wherein the controls further include filter controls configured for displaying only captions or subtitles in the second GUI that have verification errors.

13. A system for media editing, the system comprising:
an input interface;
an output interface;
one or more processors;
memory storing instructions that, when executed by the one or more processors, cause the one or more processors to perform operations comprising:
causing to display, by a display device coupled to the output interface, a graphical user interface (GUI) including a timeline;
causing to display on the timeline an anchor lane including a media object;
causing to display on the timeline a secondary lane including a first caption or subtitle object;
causing to display on the timeline a third lane including a second caption or subtitle object, wherein the first caption or subtitle object includes text in a first language, and the second caption or subtitle object includes text in a second language that is different than the first language;
anchoring the media object to the first caption or subtitle object in the timeline, wherein the anchoring comprises displaying an anchor indicator coupling the media object in the anchor lane and the first caption or subtitle object in the secondary lane, and wherein the anchoring enables the media object and the first caption or subtitle object to be concurrently manipulated as a single group of objects in the timeline;
receiving, through an input interface, an input to move at least one of the media object or the first caption or subtitle object; and
responsive to the input, causing the media object and the first caption or subtitle object to concurrently move together to a different position on the timeline.

14. The system of claim 13, the operations further comprising:
receiving a second input from the input interface; and
responsive to the second input, causing the secondary lane to be hidden from view in the timeline.

15. The system of claim 13, the operations further comprising:
receiving a second input from the input interface, the second input directed to the media object;
responsive to the second input, selecting a time range in the media object;
receiving a third input from the input interface, the third input directed to the first caption or subtitle object;
responsive to the third input, causing an editing interface to be displayed in the GUI; and
receiving a fourth input from the input interface, the fourth input entering text string into a text field of the editing interface.

16. The system of claim 13, the operations further comprising:
receiving a second input from the input interface, the second input selecting the first caption or subtitle object anchored to the media object in the anchor lane;
receiving a third input from the input interface, the third input removing the anchor between the media object and the first caption or subtitle object;
receiving a fourth input from the input interface, the fourth input selecting a second media object in the anchor lane;
anchoring the caption or subtitle object to the second media object; and
causing to display on the display device, a new anchor indicator visually indicating the anchoring of the first caption or subtitle object to the second media object.

17. The system of claim 13, the operations further comprising:
causing the first caption or subtitle object to be verified according to one or more rules;
determining that the first caption or subtitle object does not comply with at least one rule; and
causing to display on the display device visual feedback in the timeline indicating a verification error.

18. The system of claim 17, wherein the verification error is caused by the first caption or subtitle object overlapping in time with at least one other caption or subtitle object;
receiving input resizing one of the overlapping caption or subtitle objects;
responsive to the resizing, determining that the verification error has been fixed; and
causing to display on the display device, visual feedback in the timeline indicating that the verification error has been fixed.

19. The system of claim 13, the operations further comprising:
- receiving a compound object including a plurality of caption or subtitle objects;
- receiving, by the input interface, a second input;
- responsive to the second input, extracting the plurality of caption or subtitle objects from the compound object; and
- placing the extracted plurality of caption or subtitle objects in the secondary lane of the timeline.

20. The system of claim 19, the operations further comprising:
- causing to display on the display device in the GUI the compound object and a glyph or other visual indicator indicating that the compound object includes the plurality of caption or subtitle objects.

21. The system of claim 13, the operations further comprising:
- receiving a second input from the input interface; and
- responsive to the second input, causing to display on the display device a plurality of editing controls for editing the first caption or subtitle object.

22. The system of claim 13, the operations further comprising:
- receiving a second input from the input interface; and
- responsive to the second input, causing to display on the display device a plurality of roles and subroles that are assignable to the first caption or subtitle object, wherein the roles include user-selectable caption or subtitle formats for the at least one caption or subtitle role, respectively, and the subroles include user-selectable language preferences for the first caption or subtitle object.

23. The system of claim 13, the operations further comprising:
- receiving a second input from the input interface; and
- responsive to the second input, causing to display on the display device a second GUI that includes a preview window for playing back content of a project, a search engine configured to search for caption or subtitles in the project, an editing interface configured to allow a user to edit caption or subtitle objects, and a plurality of controls, the controls including transport controls for controlling playback of the content in the preview window, controls for causing the search engine to navigate through a plurality of captions or subtitles in the project based at least on one of timecodes or text terms, and editing controls for editing caption or subtitle objects in the second GUI.

24. The system of claim 23, wherein the controls further include filter controls for displaying only captions or subtitles that have verification errors in the second GUI.

25. A non-transitory, computer-readable storage medium having instructions stored thereon, which, when executed by one or more processors, cause the one or more processors to perform operations comprising:
- causing to display on a display device a graphical user interface (GUI) including a timeline;
- causing to display on the timeline an anchor lane including a media object;
- causing to display on the timeline a secondary lane including a first caption or subtitle object;
- causing to display on the timeline a third lane including a second caption or subtitle object, wherein the first caption or subtitle object includes text in a first language, and the second caption or subtitle object includes text in a second language that is different than the first language;
- anchoring the media object to the caption or subtitle object in the timeline, wherein the anchoring comprises displaying an anchor indicator coupling the media object in the anchor lane and the first caption or subtitle object in the secondary lane, and wherein the anchoring enables the media object and the first caption or subtitle object to be concurrently manipulated as a single group of objects in the timeline;
- receiving, through an input interface, an input to move at least one of the media object or the first caption or subtitle object; and
- responsive to the input, causing the media object and the first caption or subtitle object to concurrently move together to a different position on the timeline.

* * * * *